(12) United States Patent
Nie et al.

(10) Patent No.: US 9,064,537 B1
(45) Date of Patent: Jun. 23, 2015

(54) DISK DRIVE MEASURING RADIAL OFFSET BETWEEN HEADS BY DETECTING A DIFFERENCE BETWEEN RAMP CONTACT

(71) Applicant: Western Digital Technologies, Inc., Irvine, CA (US)

(72) Inventors: Jianbin Nie, Fremont, CA (US); Edgar D. Sheh, San Jose, CA (US); Brian P. Rigney, Louisville, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/040,960

(22) Filed: Sep. 30, 2013

Related U.S. Application Data

(60) Provisional application No. 61/877,399, filed on Sep. 13, 2013.

(51) Int. Cl.
*G11B 5/09* (2006.01)
*G11B 21/02* (2006.01)
*G11B 5/596* (2006.01)

(52) U.S. Cl.
CPC ............ *G11B 21/02* (2013.01); *G11B 5/59627* (2013.01)

(58) Field of Classification Search
None
See application file for complete search history.

(56) References Cited

U.S. PATENT DOCUMENTS

| | | | |
|---|---|---|---|
| 4,321,517 A | 3/1982 | Touchton et al. | |
| 4,532,802 A | 8/1985 | Yeack-Scranton et al. | |
| 4,691,152 A | 9/1987 | Ell et al. | |
| 5,075,805 A | 12/1991 | Peddle et al. | |
| 5,384,675 A | 1/1995 | Crawforth et al. | |
| 5,455,723 A | 10/1995 | Boutaghou et al. | |
| 5,485,323 A | 1/1996 | Anderson et al. | |
| 5,559,648 A | 9/1996 | Hunter et al. | |
| 5,576,906 A | 11/1996 | Fisher et al. | |
| 5,668,679 A | 9/1997 | Swearingen et al. | |
| 5,754,353 A | 5/1998 | Behrens et al. | |
| 5,761,212 A | 6/1998 | Foland, Jr. et al. | |
| 5,781,363 A | 7/1998 | Rowan et al. | |
| 5,828,522 A | 10/1998 | Brown et al. | |
| 5,831,888 A | 11/1998 | Glover | |
| 5,973,870 A | 10/1999 | Boutaghou et al. | |
| 6,000,282 A | 12/1999 | Ku et al. | |
| 6,014,283 A | 1/2000 | Codilian et al. | |
| 6,021,012 A | 2/2000 | Bang | |
| 6,023,386 A | 2/2000 | Reed et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,092,412 A | 7/2000 | Flechsig et al. | |

(Continued)

OTHER PUBLICATIONS

U.S. Appl. No. 11/760,601, filed Jun. 8, 2007, 24 pages.

(Continued)

*Primary Examiner* — Peter Vincent Agustin

(57) ABSTRACT

A disk drive is disclosed comprising a plurality of disk surfaces including a first disk surface and a second disk surface. The disk drive further comprises a plurality of heads including a first head actuated over the first disk surface, and a second head actuated over the second disk surface, as well as a ramp proximate an outer diameter of the disk surfaces. A first interval is measured while moving the first head toward the ramp until the first head contacts the ramp, and a second interval is measured while moving the second head toward the ramp until the second head contacts the ramp.

22 Claims, 6 Drawing Sheets

(56) References Cited

U.S. PATENT DOCUMENTS

| | | | |
|---|---|---|---|
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,226,154 B1 * | 5/2001 | Albrecht | 360/254.8 |
| 6,243,223 B1 | 6/2001 | Elliott et al. | |
| 6,249,896 B1 | 6/2001 | Ho et al. | |
| 6,281,652 B1 | 8/2001 | Ryan et al. | |
| 6,285,521 B1 | 9/2001 | Hussein | |
| 6,292,318 B1 | 9/2001 | Hayashi | |
| 6,292,320 B1 * | 9/2001 | Mason et al. | 360/63 |
| 6,304,407 B1 | 10/2001 | Baker et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,411,453 B1 | 6/2002 | Chainer et al. | |
| 6,429,989 B1 | 8/2002 | Schultz et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,519,107 B1 | 2/2003 | Ehrlich et al. | |
| 6,519,115 B1 * | 2/2003 | Yaeger | 360/255.7 |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,549,377 B2 | 4/2003 | Yoshida et al. | |
| 6,560,056 B1 | 5/2003 | Ryan | |
| 6,563,660 B1 | 5/2003 | Hirano et al. | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,587,293 B1 | 7/2003 | Ding et al. | |
| 6,590,732 B2 | 7/2003 | Kitagawa et al. | |
| 6,603,622 B1 | 8/2003 | Christiansen et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,643,088 B1 | 11/2003 | Kawachi | |
| 6,690,536 B1 | 2/2004 | Ryan | |
| 6,693,764 B1 | 2/2004 | Sheh et al. | |
| 6,700,726 B1 | 3/2004 | Gillis et al. | |
| 6,704,156 B1 | 3/2004 | Baker et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,721,119 B1 | 4/2004 | Hassan et al. | |
| 6,721,121 B1 | 4/2004 | Schreck et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,205 B1 | 5/2004 | Moran et al. | |
| 6,738,220 B1 | 5/2004 | Codilian | |
| 6,747,837 B1 | 6/2004 | Bennett | |
| 6,754,027 B2 | 6/2004 | Hirano et al. | |
| 6,760,186 B1 | 7/2004 | Codilian et al. | |
| 6,771,480 B2 | 8/2004 | Brito | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,798,613 B1 * | 9/2004 | Krajnovich et al. | 360/99.18 |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,902,007 B1 | 6/2005 | Orr et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,917,489 B2 | 7/2005 | Lee | |
| 6,920,004 B1 | 7/2005 | Codilian et al. | |
| 6,920,007 B2 | 7/2005 | Tominaga et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,419 B2 | 8/2005 | Suk et al. | |
| 6,937,420 B1 | 8/2005 | McNab et al. | |
| 6,937,423 B1 | 8/2005 | Ngo et al. | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,977,791 B2 | 12/2005 | Zhu et al. | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,019,932 B2 | 3/2006 | Hirano et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,046,474 B2 | 5/2006 | Kuramoto et al. | |
| 7,046,475 B2 * | 5/2006 | Hosokawa | 360/75 |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,533 B1 | 8/2006 | Shepherd et al. | |
| 7,088,547 B1 | 8/2006 | Wang et al. | |
| 7,095,579 B1 | 8/2006 | Ryan et al. | |

(56) References Cited

U.S. PATENT DOCUMENTS

| | | |
|---|---|---|
| 7,110,208 B1 | 9/2006 | Miyamura et al. |
| 7,110,214 B1 | 9/2006 | Tu et al. |
| 7,113,361 B2 | 9/2006 | Hassan |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,159,299 B1 | 1/2007 | McMunigal et al. |
| 7,177,111 B2 | 2/2007 | Gururangan et al. |
| 7,180,703 B1 | 2/2007 | Subrahmanyam et al. |
| 7,184,230 B1 | 2/2007 | Chue et al. |
| 7,190,547 B2 | 3/2007 | Khurshudov et al. |
| 7,196,864 B1 | 3/2007 | Yi et al. |
| 7,199,960 B1 | 4/2007 | Schreck et al. |
| 7,199,966 B1 | 4/2007 | Tu et al. |
| 7,203,019 B1 | 4/2007 | Liu et al. |
| 7,203,021 B1 | 4/2007 | Ryan et al. |
| 7,209,310 B1 | 4/2007 | Tsai et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,274,527 B2 | 9/2007 | Calfee et al. |
| 7,289,288 B1 | 10/2007 | Tu |
| 7,295,395 B2 | 11/2007 | Koh et al. |
| 7,298,574 B1 | 11/2007 | Melkote et al. |
| 7,301,717 B1 | 11/2007 | Lee et al. |
| 7,304,819 B1 | 12/2007 | Melkote et al. |
| 7,317,587 B2 | 1/2008 | Furuhashi et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,391,586 B2 | 6/2008 | Keast |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,486,466 B2 | 2/2009 | Hara et al. |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,194 B2 | 3/2009 | Alexander et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,300,438 B1 | 10/2012 | Herbert |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |

(56) References Cited

U.S. PATENT DOCUMENTS

| | | | |
|---|---|---|---|
| 8,542,455 B2 | 9/2013 | Huang et al. | |
| 8,553,351 B1 | 10/2013 | Narayana et al. | |
| 8,564,899 B2 | 10/2013 | Lou et al. | |
| 8,576,506 B1 | 11/2013 | Wang et al. | |
| 8,605,382 B1 | 12/2013 | Mallary et al. | |
| 8,605,384 B1 | 12/2013 | Liu et al. | |
| 8,610,391 B1 | 12/2013 | Yang et al. | |
| 8,611,040 B1 | 12/2013 | Xi et al. | |
| 8,619,385 B1 | 12/2013 | Guo et al. | |
| 8,630,054 B2 | 1/2014 | Bennett et al. | |
| 8,630,059 B1 | 1/2014 | Chen et al. | |
| 8,634,154 B1 | 1/2014 | Rigney et al. | |
| 8,634,283 B1 * | 1/2014 | Rigney et al. | 369/44.28 |
| 8,643,976 B1 | 2/2014 | Wang et al. | |
| 8,649,121 B1 | 2/2014 | Smith et al. | |
| 8,654,466 B1 | 2/2014 | McFadyen | |
| 8,654,467 B1 | 2/2014 | Wong et al. | |
| 8,665,546 B1 | 3/2014 | Zhao et al. | |
| 8,665,551 B1 | 3/2014 | Rigney et al. | |
| 8,670,206 B1 | 3/2014 | Liang et al. | |
| 8,687,312 B1 | 4/2014 | Liang | |
| 8,693,123 B1 | 4/2014 | Guo et al. | |
| 8,693,134 B1 | 4/2014 | Xi et al. | |
| 8,699,173 B1 | 4/2014 | Kang et al. | |
| 8,711,027 B1 | 4/2014 | Bennett | |
| 8,717,696 B1 | 5/2014 | Ryan et al. | |
| 8,717,699 B1 | 5/2014 | Ferris | |
| 8,717,704 B1 | 5/2014 | Yu et al. | |
| 8,724,245 B1 | 5/2014 | Smith et al. | |
| 8,724,253 B1 | 5/2014 | Liang et al. | |
| 8,724,524 B2 | 5/2014 | Urabe et al. | |
| 8,737,008 B1 | 5/2014 | Watanabe et al. | |
| 8,737,013 B2 | 5/2014 | Zhou et al. | |
| 8,743,495 B1 | 6/2014 | Chen et al. | |
| 8,743,503 B1 | 6/2014 | Tang et al. | |
| 8,743,504 B1 | 6/2014 | Bryant et al. | |
| 8,749,904 B1 | 6/2014 | Liang et al. | |
| 8,760,796 B1 | 6/2014 | Lou et al. | |
| 8,767,332 B1 | 7/2014 | Chahwan et al. | |
| 8,767,343 B1 | 7/2014 | Helmick et al. | |
| 8,767,354 B1 | 7/2014 | Ferris et al. | |
| 8,773,787 B1 | 7/2014 | Beker | |
| 8,779,574 B1 | 7/2014 | Agness et al. | |
| 8,780,473 B1 | 7/2014 | Zhao et al. | |
| 8,780,477 B1 | 7/2014 | Guo et al. | |
| 8,780,479 B1 | 7/2014 | Helmick et al. | |
| 8,780,489 B1 | 7/2014 | Gayaka et al. | |
| 8,786,976 B1 | 7/2014 | Kang et al. | |
| 8,792,202 B1 | 7/2014 | Wan et al. | |
| 8,797,664 B1 | 8/2014 | Guo et al. | |
| 8,804,267 B2 | 8/2014 | Huang et al. | |
| 8,824,081 B1 | 9/2014 | Guo et al. | |
| 8,824,262 B1 | 9/2014 | Liu et al. | |
| 2002/0071219 A1 | 6/2002 | Yoshida et al. | |
| 2002/0141101 A1 * | 10/2002 | Brittner et al. | 360/75 |
| 2002/0181139 A1 | 12/2002 | Weiehelt et al. | |
| 2004/0179289 A1 | 9/2004 | Suk et al. | |
| 2005/0128633 A1 * | 6/2005 | Hosokawa | 360/75 |
| 2005/0134994 A1 * | 6/2005 | Furuhashi et al. | 360/75 |
| 2005/0152060 A1 | 7/2005 | Gururangan et al. | |
| 2005/0280916 A1 * | 12/2005 | Calfee et al. | 360/75 |
| 2005/0286171 A1 * | 12/2005 | Kim et al. | 360/254.7 |
| 2006/0005403 A1 | 1/2006 | Calfee et al. | |
| 2007/0076317 A1 * | 4/2007 | Keast | 360/75 |
| 2007/0171560 A1 * | 7/2007 | Furuhashi et al. | 360/48 |
| 2007/0291394 A1 * | 12/2007 | Hara et al. | 360/75 |
| 2008/0002274 A1 | 1/2008 | Allen et al. | |
| 2008/0291564 A1 | 11/2008 | Tang et al. | |
| 2010/0035085 A1 | 2/2010 | Jung et al. | |
| 2010/0309574 A1 | 12/2010 | Bahirat et al. | |
| 2012/0284493 A1 | 11/2012 | Lou et al. | |
| 2013/0120870 A1 | 5/2013 | Zhou et al. | |
| 2013/0148240 A1 | 6/2013 | Ferris et al. | |

OTHER PUBLICATIONS www.microesys.com/dataStorage/specifications.html.
http://www.microesys.com/pdf/pa2000.pdf, "PA 2000 High Performance Positioning System for Servotrack Writers", MicroE Systems, PA2000 Rev.S1, 2 pages.

* cited by examiner

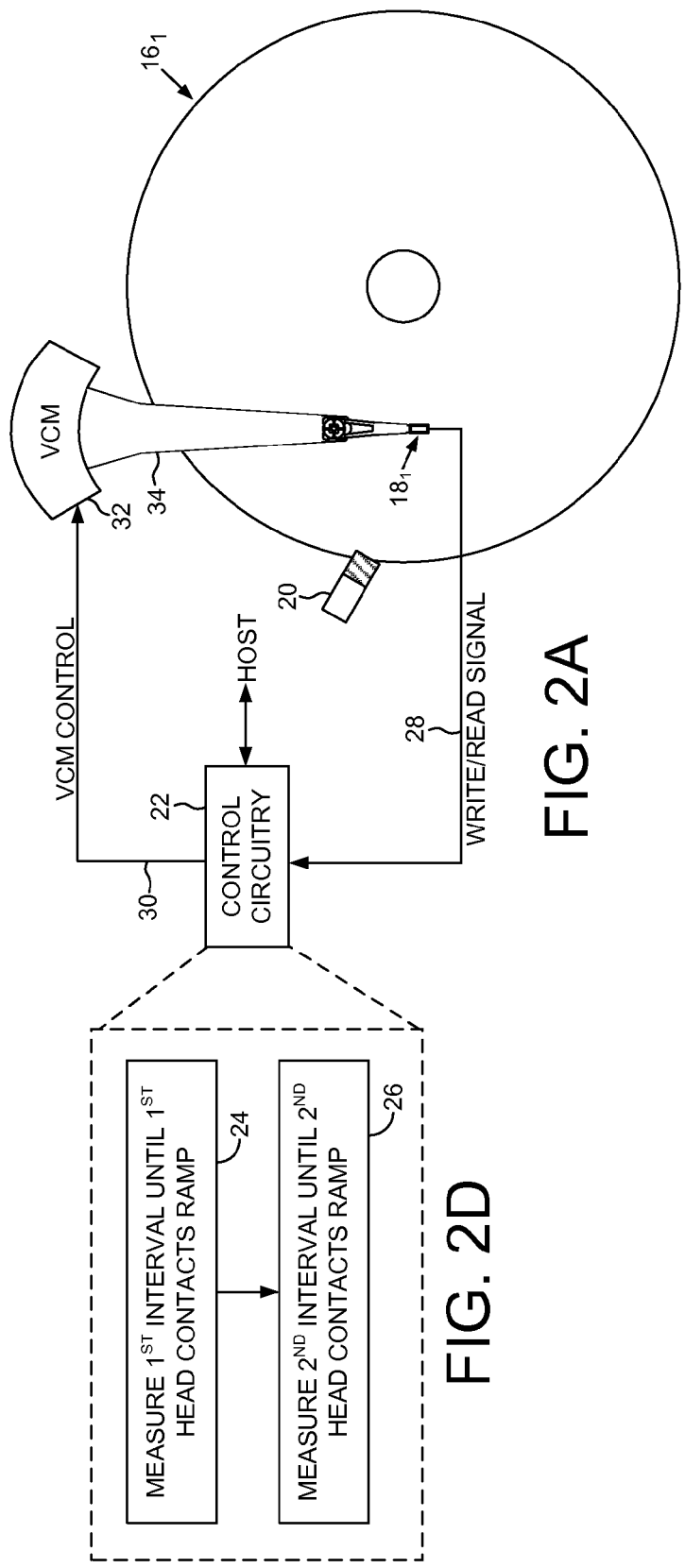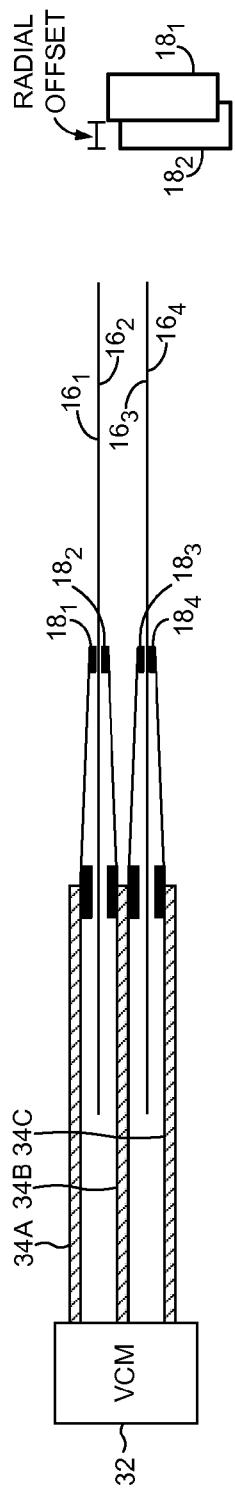

DISK DRIVE MEASURING RADIAL OFFSET BETWEEN HEADS BY DETECTING A DIFFERENCE BETWEEN RAMP CONTACT

CROSS-REFERENCE TO RELATED APPLICATIONS

This application claims priority to provisional U.S. Patent Application Ser. No. 61/877,399, filed on Sep. 13, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a disk drive according to an embodiment comprising a plurality of disk surfaces wherein a head is actuated over each disk surface.

FIG. 2C shows an embodiment wherein a first head is offset radially from a second head.

FIG. 2D is a flow diagram according to an embodiment wherein the radially offset between the first and second heads is measured based on a measured interval for each head to contact a ramp.

DETAILED DESCRIPTION

FIGS. 2A and 2B show a disk drive according to an embodiment comprising a plurality of disk surfaces $16_1$-$16_4$ including a first disk surface $16_1$ and a second disk surface $16_2$. The disk drive further comprises a plurality of heads $18_1$-$18_4$ including a first head $18_1$ actuated over the first disk surface $16_1$, and a second head $18_2$ actuated over the second disk surface $16_2$, as well as a ramp 20 proximate an outer diameter of the disk surfaces. The disk drive further comprises control circuitry 22 configured to execute the flow diagram of FIG. 2D, wherein a first interval is measured while moving the first head toward the ramp until the first head contacts the ramp (block 24), and a second interval is measured while moving the second head toward the ramp until the second head contacts the ramp (block 26).

Figure 1:
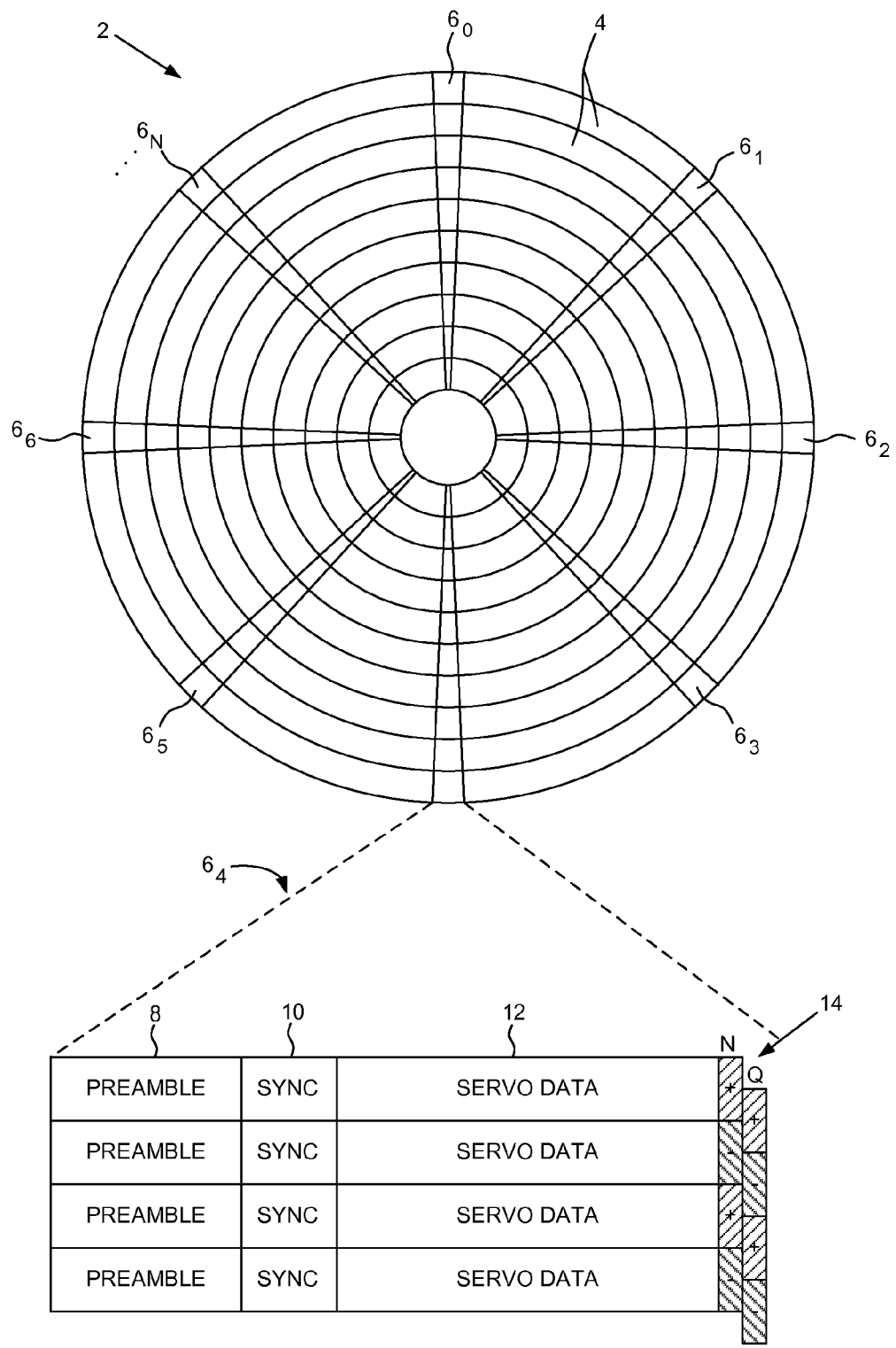
FIG. 1 shows a prior art disk format comprising a plurality of servo tracks defined by servo sectors.

When executing the flow diagram of FIG. 2D, the disk surfaces $16_1$-$16_4$ may be blank, partially written with servo data, or fully written with servo data such as the servo sectors shown in FIG. 1. In an embodiment described below, the flow diagram of FIG. 2D may be executed prior to servo writing the disk surfaces $16_1$-$16_4$ with servo data (e.g., spiral servo tracks and/or servo sectors). After the disk surfaces $16_1$-$16_4$ have been written with servo data, in one embodiment the control circuitry 22 processes a read signal 28 emanating from the head 18 to demodulate the servo data and generate a position error signal (PES) representing an error between the actual position of the head and a target position relative to a target track. The control circuitry 22 filters the PES using a suitable compensation filter to generate a control signal 30 applied to a voice coil motor (VCM) 32 which rotates an actuator arm 34 about a pivot in order to actuate the head 18 radially over the disk 16 in a direction that reduces the PES. The servo data may comprise any suitable head position information, such as a spiral servo track, or a servo sector comprising a track address for coarse positioning and servo bursts for fine positioning. The servo bursts may comprise any suitable pattern, such as an amplitude based servo pattern or a phase based servo pattern (FIG. 1).

In one embodiment, there is a radial offset between the heads $18_1$-$18_4$ due, for example, to a manufacturing tolerance of the disk drive. FIG. 2C illustrates an example of a radial offset between the first head $18_1$ and the second head $18_2$ such that when unloading the heads onto the ramp 20 the second head $18_2$ will contact the ramp 20 before the first head $18_1$ contacts the ramp 20. In one embodiment, the control circuitry 22 measures the relative radial offset between all of the heads $18_1$-$18_4$ by moving each head toward the ramp 20 and measuring a corresponding interval until each head contacts the ramp 20.

Figure 3A:
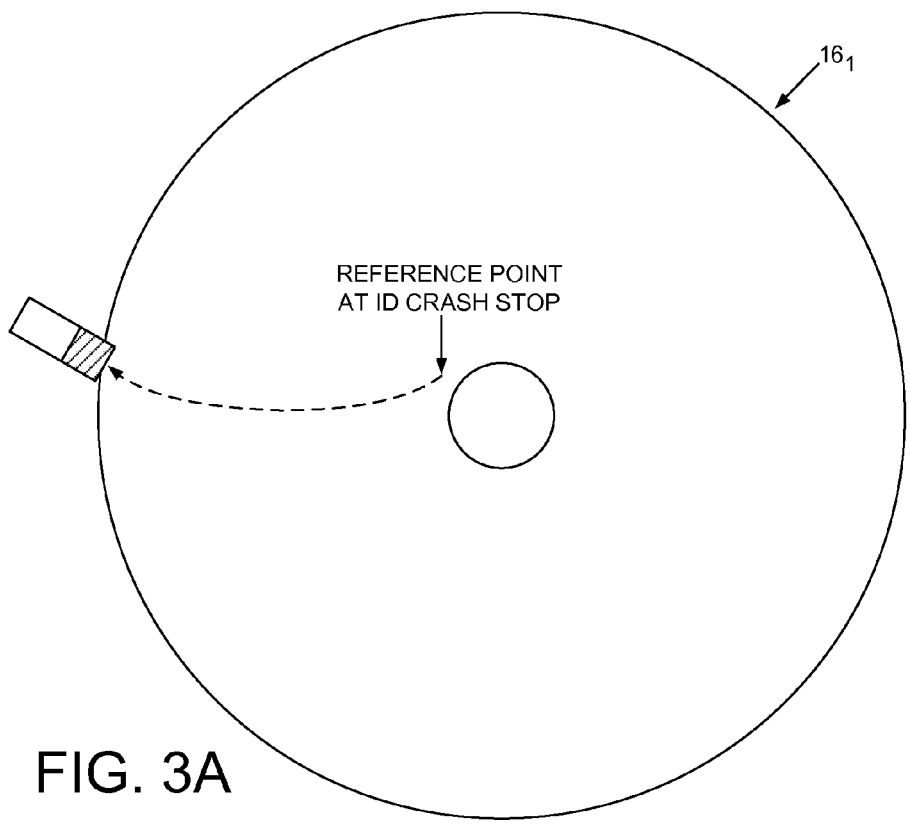
FIG. 3A shows an embodiment wherein the heads are moved from an inner diameter of the disk to the crash stop.

FIG. 3A illustrates an embodiment wherein the control circuitry 22 rotates the head stack assembly shown in FIG. 2B until it presses against an inner diameter crash stop so that the heads are positioned at a starting reference position near the inner diameter of the disk surfaces. The control circuitry 22 then rotates the head stack assembly in the opposite direction so that the heads moves toward the ramp 20. While moving the heads toward the ramp 20, a first interval is measured until the first head 18$_1$ contacts the ramp 20. The control circuitry 22 then rotates the head stack assembly back until it again presses against the inner diameter crash stop, and then performs the same operation in order to measure the second interval for the second head, and so on for each head. After measuring the interval for each head, the control circuitry 22 may evaluate the intervals in order to measure the relative radial offset between the heads (e.g., as shown in FIG. 20).

Figure 3B:
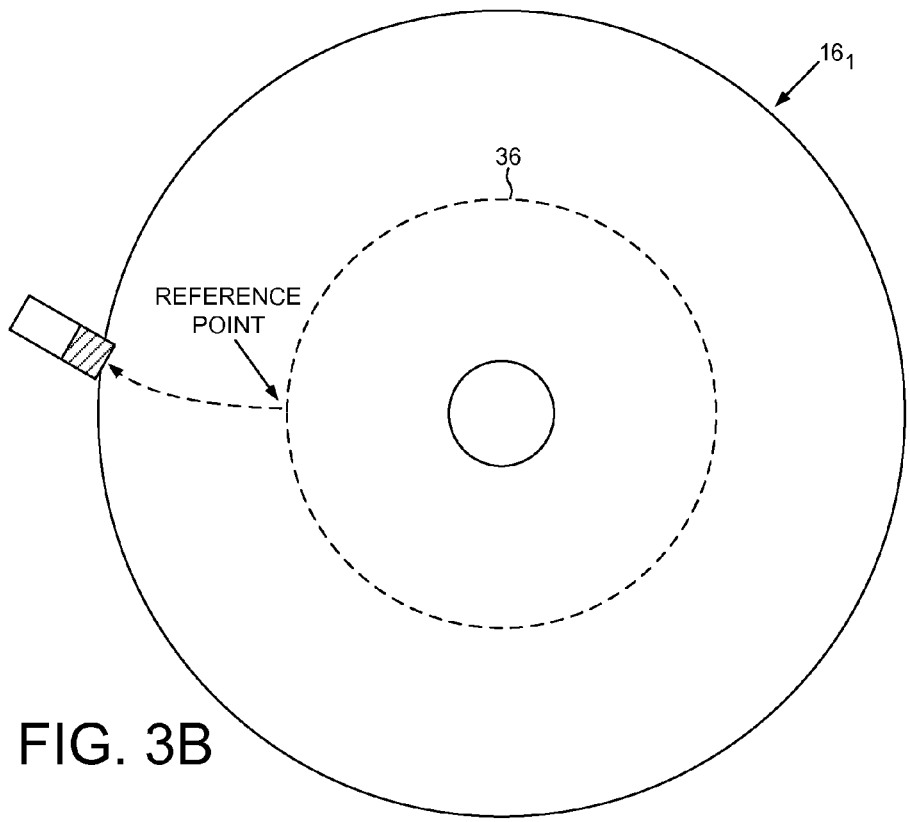
FIG. 3B shows an embodiment wherein the heads are moved from a radial location identified by a reference track to the crash stop.

The interval required for each head to contact the ramp 20 may be measured relative to any suitable reference point. FIG. 3B illustrates an embodiment wherein the heads may be moved starting from a radial location on one of the disk surfaces (e.g., the first disk surface 16$_1$) which may be defined by suitable reference servo data, such as a reference servo track 36 defined by servo sectors. In one embodiment, the reference servo track 36 may be written to the first disk surface 16$_1$ prior to servo writing the disk surface with, for example, servo sectors that define concentric servo tracks as shown in FIG. 1. Alternatively, the reference servo track 36 may comprise one of the concentric servo tracks after having servo written the first disk surface 16$_1$. In one embodiment, the control circuitry 22 positions all of the heads at the reference position by servoing the first head 18$_1$ over the first disk surface 16$_1$ until the first head 18$_1$ is positioned over the reference servo track 36. The control circuitry 22 then moves all the heads toward the ramp 20 while evaluating a suitable signal generated for one of the heads that indicates when the head has contacted the ramp 20.

In one embodiment, when moving all the heads relative to a reference point on the first disk surface 16$_1$, the first disk surface 16$_1$ may comprise any suitable servo data disbursed at any suitable frequency on the first disk surface 16$_1$. For example, the first disk surface 16$_1$ may comprise multiple reference servo tracks (such as reference servo track 36 in FIG. 3B) that are spaced radially across the disk surface. When the first head 18$_1$ is moved toward the ramp 20, the periodic servo data written on the first disk surface 16$_1$ may be read by the first head 18$_1$ in order to adjust a seek trajectory for the heads during the seek toward the ramp 20. In this embodiment, the interval for each head to contact the ramp 20 may be measured relative to the last reference point read from the first disk surface 16$_1$. In one embodiment, the servo data on the first disk surface 16$_1$ may comprise a spiral track as described in more detail below, wherein a reference point may be generated each time the head crosses the spiral track. In yet another embodiment, the servo data written on the first disk surface 16$_1$ may comprise a full set of servo written concentric servo tracks such as shown in FIG. 1, wherein the reference point for measuring the interval may be the last concentric servo track detected on the first disk surface 16$_1$ before each head contacts the ramp 20.

Any suitable signal may be generated in order to detect when one of the heads contacts the ramp 20. For example, in one embodiment the read signal emanating from the head may indicate when the head contacts the ramp 20. In another embodiment, each head may be fabricated with a suitable fly height sensor or touchdown sensor (e.g., a capacitive or magnetoresistive element) for generating a signal that may indicate when each head contacts the ramp 20. In yet another embodiment, the disk drive may employ a suitable microactuator (e.g., a piezoelectric actuator) for actuating each head over the respective disk surface in fine movements, wherein the microactuator may actuate the head in any suitable manner, such as by actuating a suspension relative to the actuator arm, or actuating the head relative to the suspension. In one embodiment, the control circuitry 22 may be configured to sense a signal generated by the microactuator which may indicate when the head contacts the ramp 20.

In one embodiment, the control circuitry 22 may evaluate the ramp contact signals generated by all of the heads concurrently while moving the head stack assembly toward the ramp 20 in a single pass. In alternative embodiment, the control circuitry 22 may evaluate the ramp contact signal generated by a single head which requires the head stack assembly to be moved toward the ramp in multiple passes (one pass for each head). This embodiment is understood with reference to the flow diagram of FIG. 4 wherein first a repeatable seek trajectory is calibrated for moving the heads from the reference point toward the ramp (block 38). Any suitable technique may be employed to calibrate the repeatable seek trajectory, such as by performing multiple seeks from the reference point to the ramp 20 and adjusting the seek trajectory (e.g., acceleration, constant velocity, and deceleration segments) until the seek time becomes substantially constant. In one embodiment, when calibrating the repeatable seek trajectory, the seek time is evaluated for a single head, such as the first head 18$_1$ in the embodiments of FIG. 3A or FIG. 3B, wherein the seek time may be measured as the interval between the beginning of the seek until the first head 18$_1$ contacts the ramp 20. In another embodiment, the first disk surface 16$_1$ may comprise reference servo data, such as one or more concentric servo tracks or a spiral track as described below. When calibrating the repeatable seek trajectory, the seek trajectory may be adjusted each time the first head 18$_1$ crosses over the reference servo data. In this embodiment, the interval for each head to contact the ramp 20 may be measured relative to the last reference point on the first disk surface 16$_1$ during the seek before the heads contact the ramp 20.

After calibrating the repeatable seek trajectory at block 38, an index i is initialized to the first head (block 40) to select the first head to measure the first interval required to move the head from the reference point until contacting the ramp. The selected head is then moved to the reference point (block 42) and then moved toward the ramp (block 44) while measuring the i$^{th}$ interval until the i$^{th}$ head contacts the ramp (block 46). The index i is incremented (block 48) and the flow diagram repeated for the next head until an interval has been measured for each head. The relative radial offset between the heads is then measured based on the measured intervals (block 50).

Figure 5:
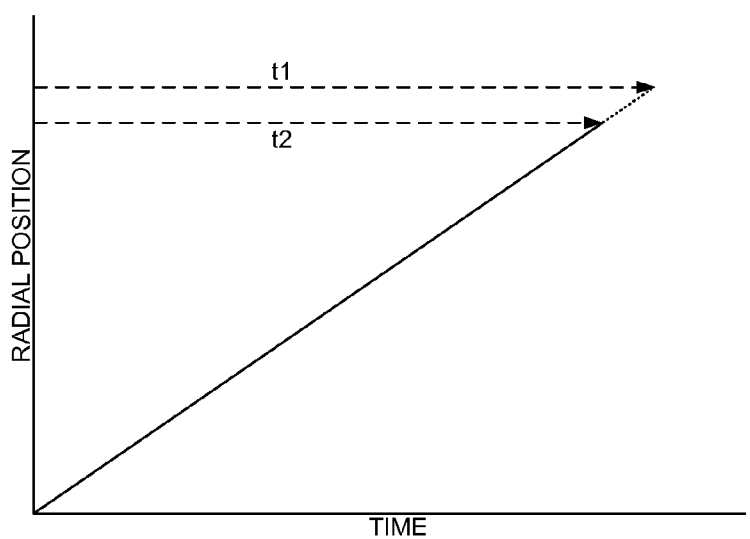
FIG. 5 illustrates a difference between measured ramp contact intervals for first and second heads which represents the radial offset between the first and second heads.

FIG. 5 illustrates a first interval (t1) measured for the first head 18$_1$ and a second interval (t2) measured for the second head 18$_2$. Referring to the example of FIG. 2C, the second head 18$_2$ is radially offset from the first head 18$_1$ such that the second head 18$_2$ will contact the ramp sooner, and therefore the second interval (t2) is shorter than the first interval (t1). The difference between the first interval (t1) and the second interval (t2) represents the radial offset between the first head 18$_1$ and the second head 18$_2$. In one embodiment, the difference between the intervals may be converted into a physical distance based on the seek trajectory used to move the heads toward the ramp 20.

Figure 4:
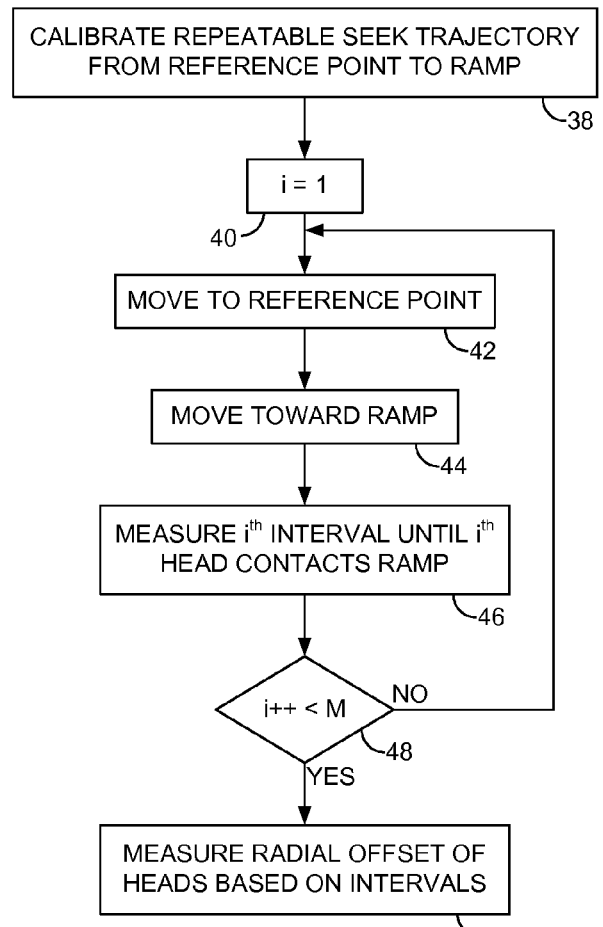
FIG. 4 is a flow diagram according to an embodiment wherein an interval for each head to contact the ramp is measured after calibrating a repeatable seek trajectory.
Figure 6A:
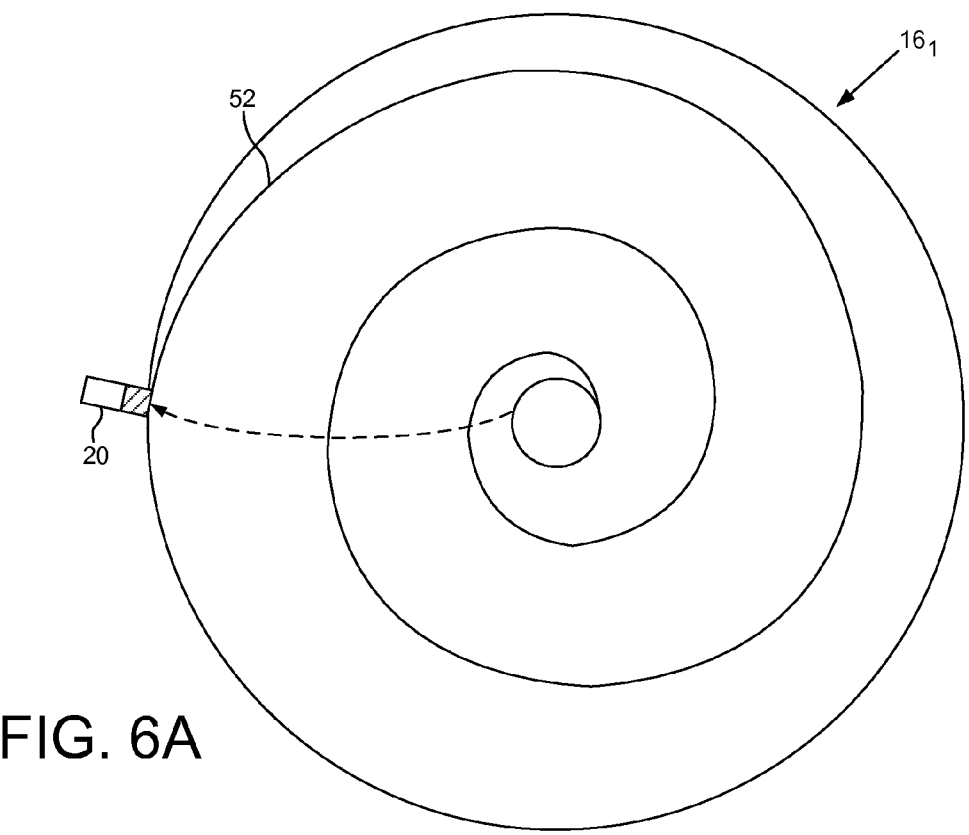
FIG. 6A shows an embodiment wherein a first spiral track is written to a first disk surface.
Figure 6B:
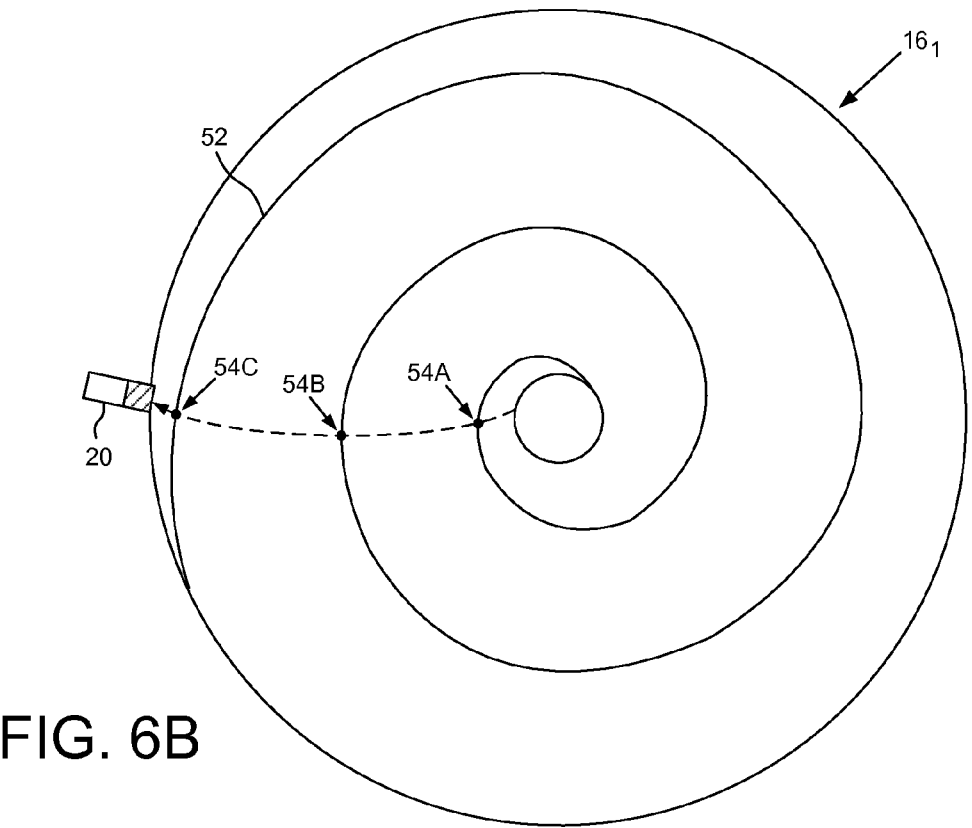
FIG. 6B shows an embodiment wherein the first spiral track on the first disk surface is read while moving the heads toward the ramp when measuring the corresponding intervals.

FIG. 6A illustrates an embodiment wherein a spiral track 52 may be written to the first disk surface 16$_1$ while moving the first head 18$_1$ at a substantially constant velocity across the first disk surface 16$_1$ until the first head 18$_1$ contacts the ramp 20. The seek trajectory for writing the spiral track 52 may be calibrated, for example, by performing multiple seeks and adjusting the seek trajectory until the seek time from the ID crash stop to the ramp 20 is substantially constant. After writing the spiral track 52, the repeatable seek trajectory may be calibrated at block 38 of FIG. 4 by reading the reference points 54A-54C on the first disk surface 16₁ at each spiral track crossing as illustrated in FIG. 6B. As each reference point is read, the seek trajectory for measuring the intervals at block 46 of FIG. 4 is adjusted. Once the seek trajectory has been calibrated, the heads are moved across the radius of the disk based on the calibrated seek trajectory and the reference points 54A-54C are read from the first disk surface 16₁ using the first head 18₁. When the last reference point 54C is reached, an interval is measured from the last reference point 54C until each head contacts the ramp 20 (i.e., the intervals shown in FIG. 5 in this embodiment are relative to the last reference point 54C on the first disk surface 16₁ as shown in FIG. 6B). In the embodiment of FIG. 4 where a seek is performed to measure the ramp contact interval for each head, each seek is started from the same radial location and from the same angular phase on the first disk surface 16₁ so that all the ramp contact intervals are measured from the same reference point 54C on the spiral track 52 during each seek. In one embodiment, the seek trajectory when measuring the ramp contact intervals causes the first head 18₁ to move faster over the first disk surface 16₁ as compared to the seek trajectory used to write the spiral track 52. The faster seek trajectory when measuring the ramp contact intervals causes the first head 18₁ to cross the spiral track 52 multiple times during the seek as shown in FIG. 6B.

In one embodiment, the disk surfaces in the disk drive may initially be devoid of any servo data (i.e., blank) prior to writing the spiral track 52 to the first disk surface 16₁. The embodiment of FIGS. 6A and 6B therefore enables measuring the ramp contact interval for each head and the relative radial offsets starting from blank, unservowritten disks. Further, servoing on the spiral track 52 written on the first disk surface 16₁ helps improve the accuracy of the measured ramp contact intervals since the spiral track 52 helps calibrate a repeatable seek trajectory at block 38 of FIG. 4. In addition, when the first head 18₁ reaches the last reference point 54C on the spiral track 52, the first head 18₁ is moving at a substantially constant velocity which improves the accuracy of the measured ramp contact intervals (as compared to starting from zero velocity at reference point 54C).

The radial offset measured relative to each head may be used for any suitable purpose. In one embodiment, the measured radial offsets may be used as a screening criterion during manufacturing in order to identify disk drives that need to be reworked or discarded. In another embodiment, the measured radial offsets may be used as feedback to improve the manufacturing process of the head stack assembly, for example, to reduce the radial offset between the heads. In yet another embodiment, the measured radial offsets may be used to limit the stroke of the heads for any suitable reason, such as to facilitate a self servo writing operation wherein the control circuitry writes servo data to each disk surface, such as spiral tracks and/or concentric servo sectors. For example, a boundary for the written servo data may be defined at the outer diameter of the disk based on the outer most diameter head that first contacts the ramp 20 so that when bank servo writing multiple disk surfaces concurrently, the servo data may extend up to the ramp 20 just before the outer most diameter head contacts the ramp 20.

Figure 6C:
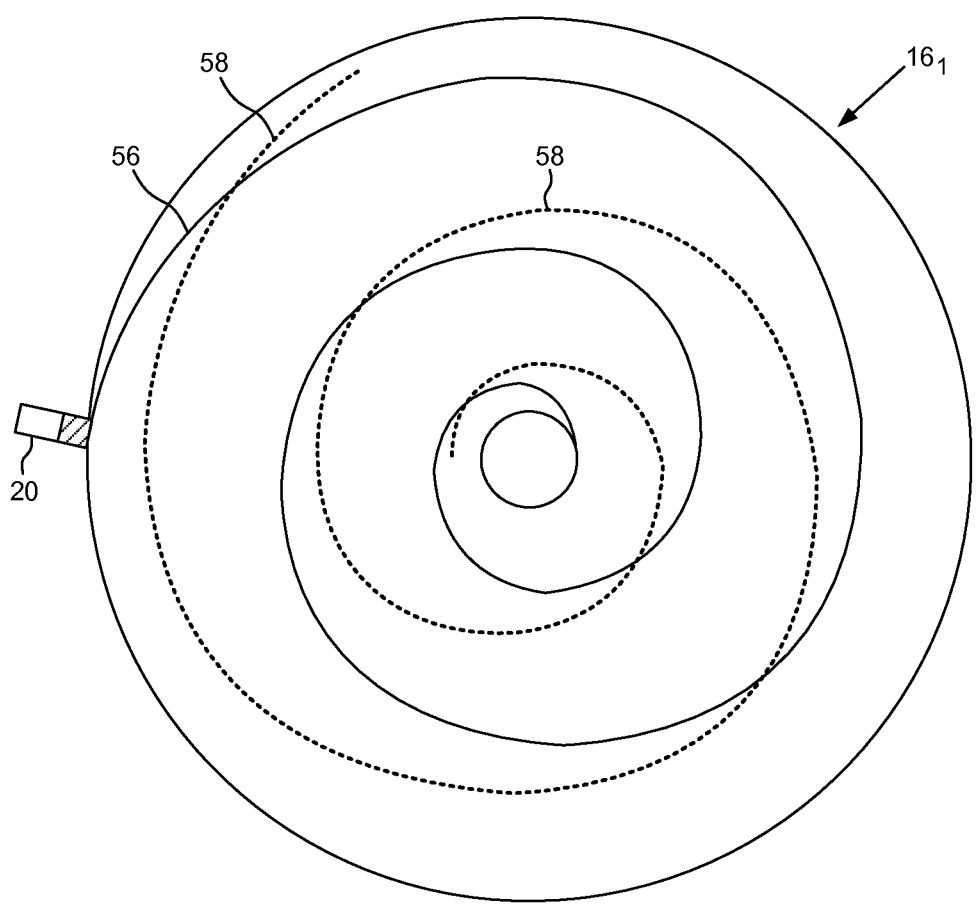
FIG. 6C shows an embodiment wherein a second spiral track is bank written to the first disk surface (and other disk surfaces) by servoing on a first spiral track written on the first disk surface.

An example of this embodiment is understood with reference to FIG. 6C where a first spiral track 56 is first written to the first disk surface 16₁ while seeking the first head 18₁ from the inner diameter toward the outer diameter, and then while servoing on the first spiral track 56 a second spiral track 58 is bank written to all of the disk surfaces including the first disk surface 16₁ as shown in FIG. 6C (where the second spiral track 58 is written by moving the heads from the outer diameter toward the inner diameter of each disk surface). The first spiral track 56 may be the same as the spiral track 52 shown in FIG. 6A, or it may be an intermediate spiral track that is written to the first disk surface 16₁ while servoing on spiral track 52. During the bank writing of the second spiral track 58 to all of the disk surfaces, the stroke of the heads is limited based on the radial offset between the heads to ensure the second spiral track 58 may be written to all of the disk surfaces, including to the disk surface with the outer most diameter head. That is, limiting the stroke of the heads ensures that all of the heads are over their respective disk surface (and not on the ramp 20) when bank writing the second spiral track 58 near the outer diameter of the disk surfaces.

In another embodiment, the servo data (e.g., second spiral track 58) may be written to each disk surface serially (rather than bank servo written) while servoing on the first spiral track 56 written on the first disk surface 16₁. For example, the second spiral track 58 may be written to the first disk surface 16₁ while servoing on the first spiral track 56, and then a second spiral track 58 may be written to the second disk surface 16₂ while servoing on the first spiral track 56. In this embodiment, it may still be desirable to limit the stroke of all the heads based on the outer most diameter head. For example, in one embodiment it may be desirable to servo write the same number of concentric servo tracks on all of the disk surfaces, and therefore the stroke of all the heads when writing the second spiral track 58 (from which the concentric servo tracks are written) may be limited based on the stroke of the outer most diameter head.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being configured to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
a plurality of disk surfaces including a first disk surface and a second disk surface;
a first head actuated over the first disk surface;
a second head actuated over the second disk surface;
a ramp proximate an outer diameter of the disk surfaces; and
control circuitry configured to:
    measure a first time interval while moving the first head toward the ramp until the first head contacts the ramp;
    measure a second time interval while moving the second head toward the ramp until the second head contacts the ramp; and
    measure a radial offset between the first head and the second head based on the first interval and the second interval.

2. The disk drive as recited in claim 1, wherein the first head and the second head are coupled to a head stack assembly, and the control circuitry is further configured to:
press the head stack assembly against an inner diameter crash stop in order to position the first head proximate an inner diameter of the first disk surface; and
after pressing the head stack assembly against the inner diameter crash stop, move the first head toward the ramp during the first interval.

3. The disk drive as recited in claim 1, wherein the control circuitry is further configured to measure the second time interval by positioning the first head over reference servo data on the first disk surface and then moving the first head and the second head toward the ramp during the second time interval.

4. The disk drive as recited in claim 1, wherein the control circuitry is further configured to measure the second time interval by moving the first head and the second head toward the ramp while periodically reading reference servo data from the first disk surface using the first head.

5. The disk drive as recited in claim 4, wherein the reference servo data comprises a spiral track.

6. The disk drive as recited in claim 1, wherein the control circuitry is further configured to limit a stroke of the first head based on the radial offset.

7. The disk drive as recited in claim 6, wherein the control circuitry is further configured to:
write first servo data on the first disk surface; and
read the first servo data from the first disk surface while writing second servo data to the second disk surface to an outer limit of the second disk surface based on the limited stroke of the first head.

8. The disk drive as recited in claim 7, wherein:
the first servo data comprises a first spiral track; and
the second servo data comprises a second spiral track.

9. A method of operating a disk drive comprising:
measuring a first time interval while moving a first head toward a ramp until the first head contacts the ramp;
measuring a second time interval while moving a second head toward the ramp until the second head contacts the ramp; and
further comprising measuring a radial offset between the first head and the second head based on the first interval and the second interval.

10. The method as recited in claim 9, wherein the first head and the second head are coupled to a head stack assembly, and the method further comprises:
pressing the head stack assembly against an inner diameter crash stop in order to position the first head proximate an inner diameter of the first disk surface; and
after pressing the head stack assembly against the inner diameter crash stop, moving the first head toward the ramp during the first interval.

11. The method as recited in claim 9, further comprising measuring the second time interval by positioning the first head over reference servo data on a first disk surface and then moving the first head and the second head toward the ramp during the second time interval.

12. The method as recited in claim 9, further comprising measuring the second time interval by moving the first head and the second head toward the ramp while periodically reading reference servo data from a first disk surface using the first head.

13. The method as recited in claim 12, wherein the reference servo data comprises a spiral track.

14. The method as recited in claim 9, further comprising limiting a stroke of the first head based on the radial offset.

15. The method as recited in claim 14, further comprising:
writing first servo data on a first disk surface; and
reading the first servo data from the first disk surface while writing second servo data to a second disk surface to an outer limit of the second disk surface based on the limited stroke of the first head.

16. The method as recited in claim 15, wherein:
the first servo data comprises a first spiral track; and
the second servo data comprises a second spiral track.

17. A disk drive comprising:
a plurality of disk surfaces including a first disk surface and a second disk surface;
a first head actuated over the first disk surface;
a second head actuated over the second disk surface;
a ramp proximate an outer diameter of the disk surfaces; and
control circuitry configured to:
    measure a first time interval while moving the first head toward the ramp until the first head contacts the ramp; and
    measure a second time interval by positioning the first head over reference servo data on the first disk surface and then moving the first head and the second head toward the ramp until the second head contacts the ramp.

18. The disk drive as recited in claim 17, wherein the control circuitry is further configured to measure the first time interval by positioning the first head over the reference servo data on the first disk surface and then moving the first head and the second head toward the ramp until the first head contacts the ramp.

19. A method of operating a disk drive comprising:
    measuring a first time interval while moving a first head toward a ramp until the first head contacts the ramp; and
    measuring a second time interval by positioning the first head over reference servo data on a first disk surface and then moving the first head and the second head toward the ramp until the second head contacts the ramp.

20. The method as recited in claim 19, further comprising measuring the first time interval by positioning the first head over the reference servo data on the first disk surface and then moving the first head and the second head toward the ramp until the first head contacts the ramp.

21. A disk drive comprising:
    a plurality of disk surfaces including a first disk surface and a second disk surface;
    a first head actuated over the first disk surface;
    a second head actuated over the second disk surface;
    a head stack assembly comprising the first head and the second head;
    a ramp proximate an outer diameter of the disk surfaces; and
    control circuitry configured to:
        press the head stack assembly against an inner diameter crash stop in order to position the first head proximate an inner diameter of the first disk surface; and
        after pressing the head stack assembly against the inner diameter crash stop, measure a first time interval while moving the first head toward the ramp until the first head contacts the ramp.

22. A method of operating a disk drive comprising:
    pressing a head stack assembly against an inner diameter crash stop in order to position a first head proximate an inner diameter of a first disk surface; and
    after pressing the head stack assembly against the inner diameter crash stop, measuring a first time interval while moving the first head toward the ramp until the first head contacts the ramp.

\* \* \* \* \*